United States Patent
Chen et al.

(10) Patent No.: US 12,538,155 B2
(45) Date of Patent: Jan. 27, 2026

(54) REPORTING FOR NON-TRIGGER BASED SENSING MEASUREMENT INSTANCES

(71) Applicant: Intel Corporation, Santa Clara, CA (US)

(72) Inventors: Cheng Chen, Camas, WA (US); Dibakar Das, Hillsboro, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 18/082,729

(22) Filed: Dec. 16, 2022

(65) Prior Publication Data

US 2023/0119873 A1   Apr. 20, 2023

Related U.S. Application Data

(60) Provisional application No. 63/402,255, filed on Aug. 30, 2022.

(51) Int. Cl.
*H04W 24/10* (2009.01)
*H04B 7/06* (2006.01)

(52) U.S. Cl.
CPC .......... *H04W 24/10* (2013.01); *H04B 7/0626* (2013.01)

(58) Field of Classification Search
CPC ..... H04W 24/10; H04W 84/12; H04B 7/0626
See application file for complete search history.

(56) References Cited

U.S. PATENT DOCUMENTS

2023/0073352 A1* 3/2023 Wei .................... H04W 52/0216
2025/0119939 A1* 4/2025 Jang ..................... H04W 74/00

* cited by examiner

*Primary Examiner* — Chuong A Ngo
(74) *Attorney, Agent, or Firm* — Schwegman Lundberg & Woessner, P.A.

(57) ABSTRACT

An access point station (AP) configured for wireless local area network (WLAN) sensing may be configured to perform a sensing measurement setup with a non-AP station (non-AP STA). The sensing measurement setup may comprise an exchange of sensing measurement request and response frames to establish sensing measurement parameters for one or more sensing measurement instances including trigger-based and non-trigger based sensing measurement instances. The AP may perform sensing measurements with the non-AP STA by transmitting and/or receiving one or more null-data packets (NDPs) for a sensing measurement instance. The NDPs may be configured in accordance with the sensing measurement parameters. For performing a non-trigger based sensing measurement instance when the AP is operating a sensing responder and when reporting was indicated in a sensing measurement setup request frame received from the non-AP STA, the AP may encode a sensing measurement report for transmission to the non-AP STA.

20 Claims, 7 Drawing Sheets

REPORTING FOR NON-TRIGGER BASED SENSING MEASUREMENT INSTANCES

PRIORITY CLAIM

This application claims priority under 35 U.S.C. 119(e) to U.S. Provisional Patent Application Ser. No. 63/402,255 filed Aug. 30, 2022 [reference number AE8525-Z] which is incorporated herein by reference in its entirety.

TECHNICAL FIELD

Embodiments pertain to wireless communications. Some embodiments pertain to wireless networks including wireless local area networks (WLANs) and Wi-Fi networks including networks operating in accordance with the IEEE 802.11 family of standards. Some embodiments relate to extremely high throughput (EHT) communications. Some embodiments pertain to WLAN sensing in accordance with draft standard IEEE P802.11bf.

BACKGROUND

WLAN sensing is the use of PHY and MAC features of IEEE 802.11 stations to obtain measurements that may be useful to estimate features such as range, velocity, and motion of objects in an area of interest. Measurements obtained with WLAN sensing may be used to enable applications such as presence detection and gesture classification. One issue with WLAN sensing is reporting sensing measurements.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

An access point station (AP) configured for wireless local area network (WLAN) sensing may be configured to perform a sensing measurement setup with a non-AP station (non-AP STA). The sensing measurement setup may comprise an exchange of sensing measurement request and response frames to establish sensing measurement parameters for one or more sensing measurement instances including trigger-based and non-trigger based sensing measurement instances. The AP may perform sensing measurements with the non-AP STA by transmitting and/or receiving one or more null-data packets (NDPs) for a sensing measurement instance. The NDPs may be configured in accordance with the sensing measurement parameters. For performing a non-trigger based sensing measurement instance when the AP is operating a sensing responder and when reporting was indicated in a sensing measurement setup request frame received from the non-AP STA, the AP may encode a sensing measurement report for transmission to the non-AP STA. These embodiments, as well as others, are discussed in more detail below.

Figure 1:
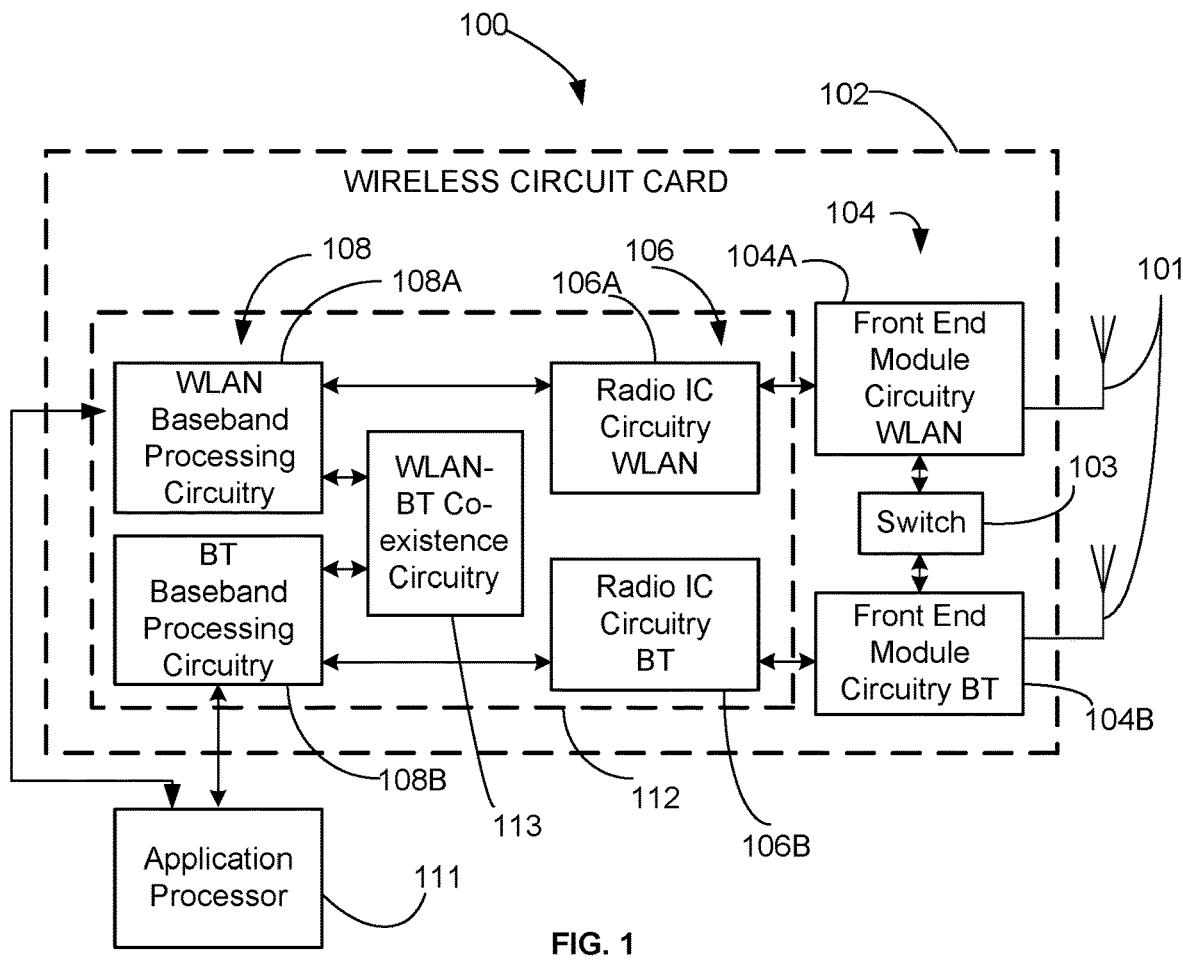
FIG. 1 is a block diagram of a radio architecture, in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, IEEE 802.11ax, and/or IEEE P802.11be standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-to-everything (NGV) communications in accordance with the IEEE 802.11bd standard and one or more stations including AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
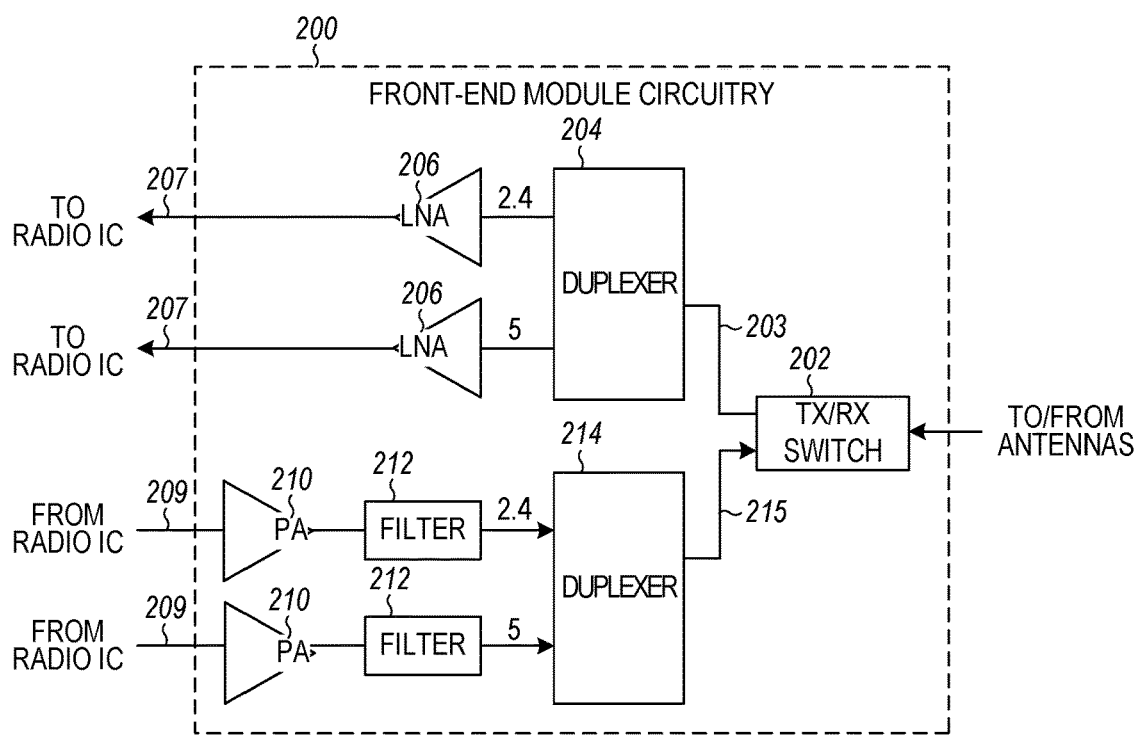
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
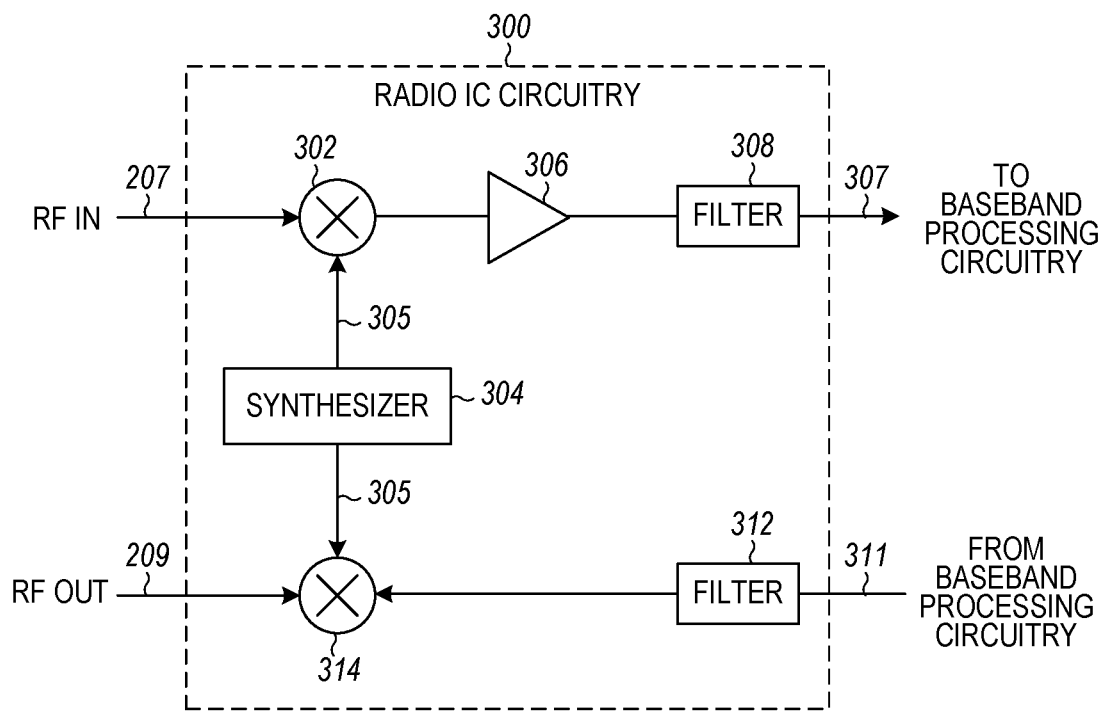
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
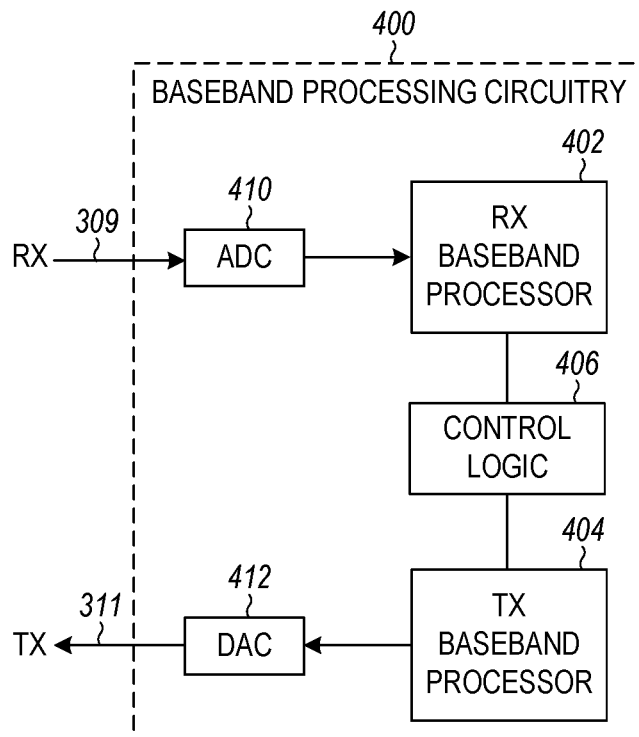
FIG. 4 illustrates a baseband processing circuitry for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
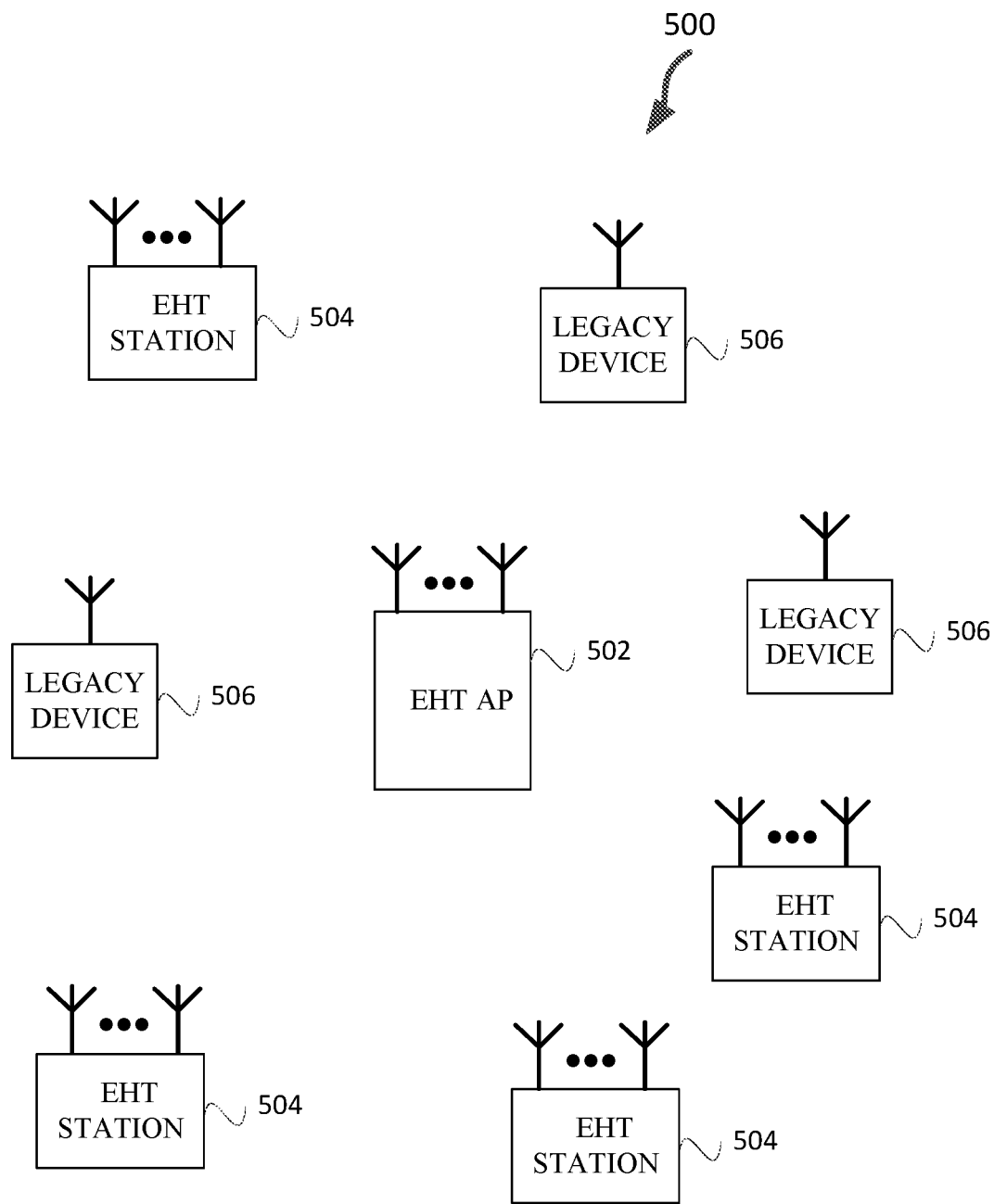
FIG. 5 illustrates a WLAN, in accordance with some embodiments.

FIG. 5 illustrates a WLAN 500 in accordance with some embodiments. The WLAN 500 may comprise a basis service set (BSS) that may include an access point (AP) 502, which may be an AP, a plurality of stations 504, and a plurality of legacy (e.g., IEEE 802.11n/ac/ax) devices 506. In some embodiments, WLAN 500 may be configured for Extremely High Throughput (EHT) communications in accordance with the IEEE 802.11be standard and one or more stations including AP 502 may be EHT STAs. In some embodiments, WLAN 500 may be configured for next generation vehicle-to-everything (NGV) communications in accordance with the IEEE 802.11bd standard and one or more stations including AP 502 may be next generation vehicle-to-everything (NGV) stations (STAs).

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502. IEEE P802.11be/D2.0, May 2022 is incorporated herein by reference.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the STAs 504 may be termed high efficiency (HE) stations.

AP 502 may communicate with legacy devices 506 in accordance with legacy IEEE 802.11 communication techniques. In example embodiments, AP 502 may also be configured to communicate with STAs 504 in accordance with legacy IEEE 802.11 communication techniques.

In some embodiments, a frame may be configurable to have the same bandwidth as a channel. The frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA PPDU formats. In some embodiments, the 106-subcarrier RU is used in the 20 MHz, 40 MHz, 80 MHz, 160 MHz and 80+80 MHz OFDMA and MU-MIMO PPDU formats. In some embodiments, the 242-subcarrier RU is used in the 40 MHz, 80 MHz, 160 MHz and 80+80 MHz OFDMA and MU-MIMO PPDU formats. In some embodiments, the 484-subcarrier RU is used in the 80 MHz, 160 MHz and 80+80 MHz OFDMA and MU-MIMO PPDU formats. In some embodiments, the 996-subcarrier RU is used in the 160 MHz and 80+80 MHz OFDMA and MU-MIMO PPDU formats.

A frame may be configured for transmitting a number of spatial streams, which may be in accordance with MU-MIIVIO and may be in accordance with OFDMA. In other embodiments, AP 502, STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE and/or EHT communications. In accordance with some IEEE 802.11 embodiments (e.g., IEEE 802.11ax embodiments) a AP 502 may operate as a master station which may be arranged to contend for a wireless medium (e.g., during a contention period) to receive exclusive control of the medium for an control period. In some embodiments, the control period may be termed a transmission opportunity (TXOP). AP 502 may transmit a master-sync transmission, which may be a trigger frame or control and schedule transmission, at the beginning of the control period. AP 502 may transmit a time duration of TXOP and sub-channel information. During the control period, STAs 504 may communicate with AP 502 in accordance with a non-contention based multiple access technique such as OFDMA or MU-MIMO. This is unlike conventional WLAN communications in which devices communicate in accordance with a contention-based communication technique, rather than a multiple access technique. During the control period, the AP 502 may communicate with STAs 504 using one or more frames. During the control period, the STAs 504 may operate on a sub-channel smaller than the operating range of the AP 502. During the control period, legacy stations refrain from communicating. The legacy stations may need to receive the communication from the AP 502 to defer from communicating.

In accordance with some embodiments, during TXOP the STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or non-legacy stations 504 in accordance with legacy IEEE 802.11 communication techniques. In some embodiments, the AP 502 may also be configurable to communicate with STAs 504 outside the TXOP in accordance with legacy IEEE 802.11 communication techniques, although this is not a requirement.

In some embodiments station 504 may be a "group owner" (GO) for peer-to-peer modes of operation. A wireless device may be a Station 502 or a AP 502.

In some embodiments, the station 504 and/or AP 502 may be configured to operate in accordance with IEEE 802.11mc. In example embodiments, the radio architecture of FIG. 1 is configured to implement the station 504 and/or the AP 502. In example embodiments, the front-end module circuitry of FIG. 2 is configured to implement the station 504 and/or the AP 502. In example embodiments, the radio IC circuitry of FIG. 3 is configured to implement the station 504 and/or the AP 502. In example embodiments, the base-band processing circuitry of FIG. 4 is configured to implement the station 504 and/or the AP 502.

In example embodiments, the Stations 504, AP 502, an apparatus of the Stations 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein.

In example embodiments, the station 504 and/or the AP 502 are configured to perform the methods and operations/functions described herein. In example embodiments, an apparatus of the station 504 and/or an apparatus of the AP 502 are configured to perform the methods and functions described herein. The term Wi-Fi may refer to one or more of the IEEE 802.11 communication standards. AP and STA may refer to access point 502 and/or station 504 as well as legacy devices 506.

In some embodiments, a AP STA may refer to a AP 502 and a STAs 504 that is operating a APs 502. In some embodiments, when an STA 504 is not operating as a AP, it may be referred to as a non-AP STA or non-AP. In some embodiments, STA 504 may be referred to as either a AP STA or a non-AP.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE Std 802.11-2020 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

The IEEE 802.11bf standard aims to standardize Wi-Fi sensing that uses Wi-Fi technology to perform radar-like applications such as detecting motion in a room or detecting when a person approaches a target device. Sensing is performed by tracking channel estimates obtained when decoding multiple Wi-Fi packets over time and detecting variations that indicate an event of interest.

Figure 6:
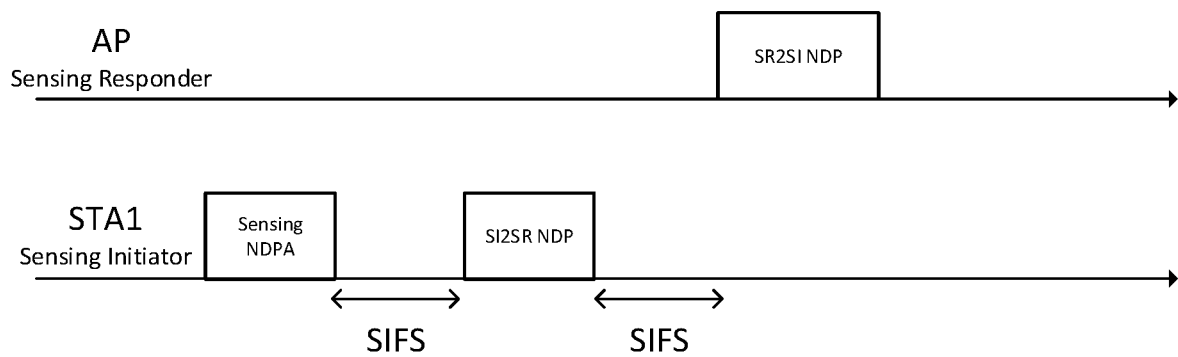
FIG. 6 illustrates a non-TB sensing measurement instance that does not include reporting, in accordance with some embodiments.

In IEEE 802.11bf, depending on whether an AP or a non-AP STA is the sensing initiator, a Trigger based (TB) and non-Trigger based (non-TB) sensing measurement instance(s) may be used to perform corresponding sensing measurement and sensing measurement report, respectively. Basically, if a non-AP STA is the sensing initiator and intends to perform sensing measurement with an AP, we will use non-TB sensing measurement instances illustrated in FIG. 6

However, currently the protocol is not complete because it does not specify if sensing measurement results reporting is required, how does the AP send the sensing measurement results back to the STA, who is the sensing initiator that requests the measurement results. Embodiments disclosed herein describe a design for the reporting of sensing measurement results for non-TB sensing measurement instances. In some embodiments, changes to the reporting part for a non-TB sensing measurement instance are proposed. In some embodiments, reporting in a non-TB sensing measurement instance is only present if the Sensing Measurement Report subfield within the Sensing Measurement Setup Request frame that resulted in the non-TB sensing measurement instance is set to 1. In some embodiments, reporting, if present, can be either immediate or delayed in a non-TB sensing measurement instance. In some embodiments, two parameters are defined: a) Min Time Between non-TB Sensing Measurement Instances and b) Max Time Between non-TB Sensing Measurement Instances to indicate the minimum and maximum time between two consecutive non-TB sensing measurement instances initiated by the non-AP STA sensing initiator.

In some embodiments, the reporting in a non-TB sensing measurement instance is only present if the Sensing Measurement Report subfield within the Sensing Measurement Setup Request frame that resulted in the non-TB sensing measurement instance is set to 1. For example, if the non-AP STA is the sensing receiver and the AP is the sensing transmitter, there is no need for reporting. Even if the non-AP STA is the sensing transmitter and the AP is the sensing receiver, the non-AP STA can still set the Sensing Measurement Report subfield within the Sensing Measurement Setup Request frame to 0 to indicate to the AP that reporting is not required.

In some embodiments, immediate reporting and delayed reporting may be signaled. If reporting is required, the non-AP STA and AP will also negotiate whether to use immediate reporting or delayed reporting. This may be indicated in the sensing measurement setup prior to a non-TB sensing measurement instance. For immediate reporting, the AP may send a Sensing Measurement Report frame to the non-AP STA containing sensing measurement results obtained from the current non-TB sensing measurement instance. For delayed reporting, the AP may send a Sensing Measurement Report frame to the non-AP STA containing sensing measurement results obtained from the previous non-TB sensing measurement instance.

For delayed reporting, in the first non-TB sensing measurement instance, there may be two options for the AP: Option 1: The AP simply does not send a Sensing Measurement Report frame to the non-AP STA. Given that the non-AP STA and AP already negotiated to use delayed reporting, and the non-AP STA understands that for the $1^{st}$ non-TB sensing measurement instance, there will be no Sensing Measurement Report frame from the AP. Option 2: The AP still sends a Sensing Measurement Report frame to the non-AP STA but includes invalid measurement report. We can add an indication subfield "Invalid Measurement" in the Sensing Measurement Report frame for the AP to indicate this is an invalid report by setting the Invalid Measurement subfield to 1.

Min Time Between non-TB Sensing Measurement Instances and Max Time Between non-TB Sensing Measurement Instances. In some embodiments, these two parameters may be selected to indicate the minimum and maximum time between two consecutive non-TB sensing measurement instances initiated by the non-AP STA sensing initiator. In some embodiments, the preferred values for these two parameters may be indicated by the non-AP STA in the Sensing Measurement Setup Request frame. In these embodiments, the AP may assign the final value for these two parameters in the Sensing Measurement Setup Response frame considering the non-AP STA's preferences and the measurement exchange duration. In some embodiments, a non-TB specific subelement may include such signaling. The non-TB specific subelement may be a subelement under the existing Sensing Measurement Parameters element, although this is not a requirement.

TABLE 1

Proposed subelement IDs for Sensing Measurement Parameters element.

| Subelement ID | Name | Extensible |
|---|---|---|
| 0 | TB Specific subelement | Yes |
| 1 | Non-TB Specific subelement | Yes |
| 2-255 | Reserved | |

| Sub-element ID | Length | Min Time Between non-TB Sensing Measurement Instances | Max Time Between non-TB Sensing Measurement Instances | Re-served |
|---|---|---|---|---|
| Bits 8 | 8 | 20 | 20 | 8 |

In some embodiments, the Min Time Between non-TB Sensing Measurement Instances is requested by the non-AP STA in the Sensing Measurement Setup Request frame and assigned by the AP in the Sensing Measurement Setup Response frame which indicate the minimum time between two consecutive non-TB sensing measurement instances initiated by the non-AP STA, in units of 100 µs.

In some embodiments, the Max Time Between non-TB Sensing Measurement Instances is requested by the non-AP STA in the Sensing Measurement Setup Request frame and assigned by the AP in the Sensing Measurement Setup Response frame which indicate the maximum time between two consecutive non-TB sensing measurement instances initiated by the non-AP STA, in units of 100 µs.

Figure 7:
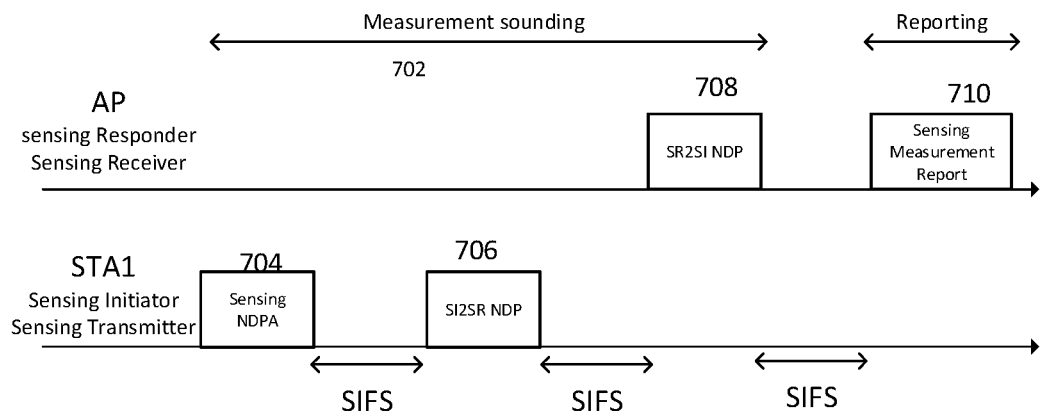
FIG. 7 illustrates a non-TB sensing measurement instance that includes reporting, in accordance with some embodiments.
Figure 8:
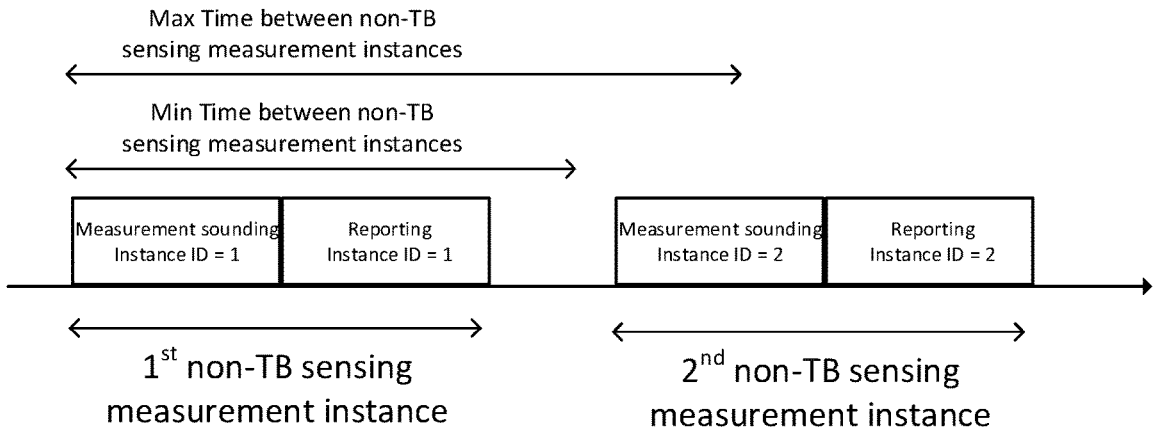
FIG. 8 illustrates immediate reporting for non-TB sensing measurement instance(s), in accordance with some embodiments.
Figure 9:
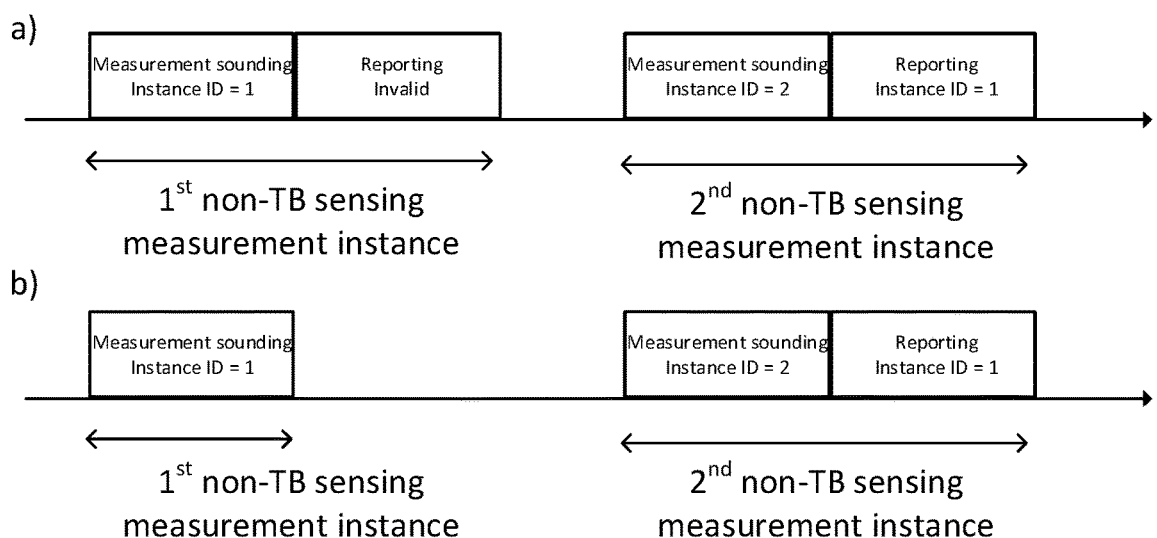
FIG. 9 illustrates delayed reporting for non-TB sensing measurement instance(s), in accordance with some embodiments.

FIG. 7 shows a non-TB sensing measurement instance with reporting included. FIG. 8 and FIG. 9 show examples of immediate reporting and delayed reporting, respectively. FIG. 8 also shows the time between two consecutive non-TB sensing measurement instances may be no less than the Min Time Between non-TB Sensing Measurement Instances, and no more than the Max Time Between non-TB Sensing Measurement Instances.

In FIG. 9, for delayed reporting for non-TB sensing measurement instance(s), for a) Option 1: The AP simply does not send a Sensing Measurement Report frame to the non-AP STA in the $1^{st}$ non-TB sensing measurement instance. b) Option 2: The AP sends an invalid Sensing Measurement Report frame to the non-AP STA in the $1^{st}$ non-TB sensing measurement instance.

In some embodiments, a MinBetweenMeasurement timer may be used as a parameter to the MS Req/Res frame exchange and modify this text to reflect when non-AP STA can begin NTB sensing measurement sequence.

In some embodiments, a non-TB sensing measurement instance is the non-trigger-based variant of a sensing measurement instance. It is applicable in scenarios where a non-AP STA is the sensing initiator, and an AP is the sensing responder. Whenever the medium is available, the non-AP STA may initiate a non-TB sensing measurement instance. The AP may limit the frequency with which the non-AP STA can initiate a non-TB sensing measurement instance, by assigning a minimum time interval between two consecutive non-TB sensing measurement instances.

In some embodiments, a non-TB sensing measurement instance may include of a measurement sounding phase. It may also consist of a reporting phase if the Sensing Measurement Report Requested subfield within the Sensing Measurement Setup Request frame that resulted in the non-TB sensing measurement instance is set to 1.

In some embodiments, the non-AP STA may set the Min Time Between Measurements field in the Sensing Measurement Setup Request frame taking into account the measurement exchange duration and the AP's capability indicated in the Min Time Between Measurements subfield carried in the Sensing element.

In some embodiments, the non-AP STA may not initiate a new non-TB sensing measurement instance associated with a same measurement setup until the assigned minimum time interval between two consecutive non-TB sensing measurement instances has elapsed.

In some embodiments, for Measurement sounding phase for A non-AP STA, acting as a sensing initiator, may initiate a non-TB sensing measurement instance by transmitting a Sensing NDP Announcement frame addressed to the AP, followed by an SI2SR NDP after SIFS. The non-AP STA may transmit the SI2SR NDP with the same bandwidth as the PPDU carrying the Sensing NDP Announcement frame. In response to the correctly received Sensing NDP Announcement frame addressed to itself, SIFS after the SI2SR NDP, the AP may transmit an SR2SI NDP to the non-AP STA. The AP may transmit the SR2SI NDP with the same bandwidth as the PPDU carrying the Sensing NDP Announcement frame.

In some embodiments, if the non-AP STA is only the sensing transmitter, the Sensing NDP Announcement frame should configure the SR2SI NDP to be transmitted with the minimum possible length of one LTF symbol. If the non-AP STA is only the sensing receiver, the Sensing NDP Announcement frame should configure the SI2SR NDP to be transmitted with the minimum possible length of one LTF symbol.

In some embodiments, the reporting phase may only be present if the Sensing Measurement Report Requested subfield within the Sensing Measurement Setup Request frame that resulted in the non-TB sensing measurement instance is set to 1. If the reporting phase is present, the AP may send a Sensing Measurement Report frame to the non-AP STA SIFS after transmitting the SR2SI NDP.

In some embodiments, the AP may transmit a Sensing Measurement Report frame corresponding to the sensing measurement results of the SI2SR NDP for either the current non-TB sensing measurement instance (see FIG. 7) or for the previous non-TB sensing measurement instance consistently throughout all the subsequent non-TB sensing measurement instances associated with the same measurement setup. In the latter case, in the first non-TB sensing measurement instance for a given sensing measurement setup, the AP may set the Invalid Measurement subfield in the Sensing Measurement Report frame to 1.

In some embodiments, the Invalid Measurement subfield indicates whether the reported measurement result is invalid. An Invalid Measurement field value of 1 indicates that the reported measurement result is invalid. A value of 0 indicates that the reported measurement result is valid.

Some embodiments are directed to an access point station (AP) configured for wireless local area network (WLAN) sensing. In these embodiments for WLAN sensing, the AP may be configured to perform a sensing measurement setup with a non-AP station (non-AP STA). The sensing measurement setup may comprise an exchange of sensing measurement request and response frames to establish sensing measurement parameters for one or more sensing measurement instances including trigger-based and non-trigger based sensing measurement instances. In these embodiments, the AP may perform sensing measurements with the non-AP STA by transmitting and/or receiving one or more null-data packets (NDPs) for a sensing measurement instance. In these embodiments, the NDPs may be configured in accordance with the sensing measurement parameters. For performing a non-trigger based sensing measurement instance when the AP is operating a sensing responder and when reporting was indicated in a sensing measurement setup request frame received from the non-AP STA, the AP may encode a sensing measurement report for transmission to the non-AP STA.

In some embodiments, the sensing measurements may comprise measuring channel variation based on channel state information (CSI). Unlike conventional ranging, a STA performing WLAN sensing measures channel variation, not distance, which may be based on channel state information (CSI) between TX-RX antenna pairs. These embodiments are discussed in more detail below.

In some embodiments, when the reporting was not indicated in the sensing measurement setup request frame received from the non-AP STA, the AP may refrain from encoding a sensing measurement report for transmission to the non-AP STA.

In some embodiments, the reporting may be indicated by a value of zero or one in a sensing measurement report subfield of the sensing measurement setup request frame received from the STA. In these embodiments, when the non-AP STA is acting as the sensing receiver and the AP is acting as the sensing transmitter, there may be no need for reporting. However, when the non-AP STA is acting as the sensing transmitter and the AP is acting as the sensing receiver, the non-AP STA may set the value in the sensing measurement report subfield of the sensing measurement setup request frame to indicate whether or not reporting is required.

In some embodiments, when reporting is indicated in a sensing measurement report subfield, the sensing measurement parameters for the sensing measurement instance may include an indicator of whether immediate reporting or delayed reporting is requested.

In some embodiments, when immediate reporting is requested, the sensing measurement report may be encoded to include sensing measurement results from a current non-TB sensing measurement instance. In these embodiments, when immediate reporting is not requested (i.e., for delayed reporting), the AP may either encode the sensing measurement report to include sensing measurement results from a prior non-TB sensing measurement instance or refrain from sending the sensing measurement report. In some embodiments, for delayed reporting the AP may send an invalid sensing measurement report with a subfield that indicates that the report is invalid, although the scope of the embodiments is not limited in this respect.

In some embodiments, the sensing measurement parameters may also include a minimum and maximum time between two consecutive non-TB sensing measurement instances when the non-AP STA is operating as a sensing initiator.

In some embodiments, as part of the sensing measurement setup, the AP may be configured to encode a Sensing Measurement Setup Request frame to include a subfield that indicates the minimum and the maximum time between two consecutive non-TB sensing measurement instances. In some embodiments, when the non-AP STA is operating the sensing initiator for a non-TB sensing measurement instance 702 (see FIG. 7), the processing circuitry of the AP STA is configured to decode a sensing NDPA 704 received from a non-AP station (STA), decode a sensing initiator to sensing responder (SI2SR) NDP 706 from the non-AP STA, and encode an SR2SI NDP 708 for transmission to the STA an SIFS after the SI2SR NDP. In these embodiments, when reporting was indicated, the AP may generate the sensing measurement report 710 based, at least in part on the SI2SR NDP 706 received from the non-AP STA.

In some embodiments, the sensing measurements may include channel measurements based on the long-training fields (LTFs) of the NDPs of a channel between the non-AP STA and the AP. In these embodiments, for the WLAN sensing, the AP may also be configured to estimate features such as range, velocity, and motion of objects, other than the non-AP STA and the AP, in an area of interest based on the channel measurements. In these embodiments, WLAN sensing may be used to estimate features such as range, velocity, and motion of objects in an area of interest based on sensing measurements of the channel between an AP and one or more non-AP STAs. WLAN sensing enables motion detection, gesture recognition as well as biometric measurements of object by using WLAN signals. The objects are different from the STAs that are performing sensing. This is unlike conventional ranging which may be used determine a distance between wireless devices and determine a location of wireless devices based on signals transmitted by those devices performing ranging. WLAN sensing is currently being addressed in by the IEEE in draft standard IEEE P802.11bf™/D0.2, July 2022. Ranging, for example, uses NDPs to measure a time-of-flight from which a distance to another STA may be computed. Hence in ranging, a STA needs to report back accurate ToA, ToD etc. In WLAN sensing on the other hand, NDPs are used to measure variation in channel and so a STA reports back CSI between TX-RX antenna pairs. Unlike WLAN sensing, the ranging protocol needs to signal both TX and RX parameters since an initiator/responder needs to both send an NDP and receive an NDP in every instance. In WLAN sensing, there is no such requirement (i.e., a STA can either send an NDP or receive an NDP or both during negotiated measurement instances). Furthermore, unlike WLAN sensing, ranging parameters are defined for <320 MHz bandwidth.

Some embodiments are directed to a non-transitory computer-readable storage medium that stores instructions for execution by processing circuitry of an access point station (AP). For wireless local area network (WLAN) sensing, the processing circuitry may be configured to perform a sensing measurement setup with a non-AP station (non-AP STA). As discussed above, the sensing measurement setup comprising an exchange of sensing measurement request and response frames to establish sensing measurement parameters for one or more sensing measurement instances including trigger-based and non-trigger based sensing measurement instances. In these embodiments, the processing circuitry may configure the AP to perform sensing measurements with the non-AP STA by transmitting and/or receiving one or more null-data packets (NDPs) for a sensing measurement instance, the NDPs configured in accordance with the sensing measurement parameters. For performing a non-trigger based sensing measurement instance when the AP is operating a sensing responder and when reporting was indicated in a sensing measurement setup request frame received from the non-AP STA, the processing circuitry may encode a sensing measurement report for transmission to the non-AP STA.

Figure 10:
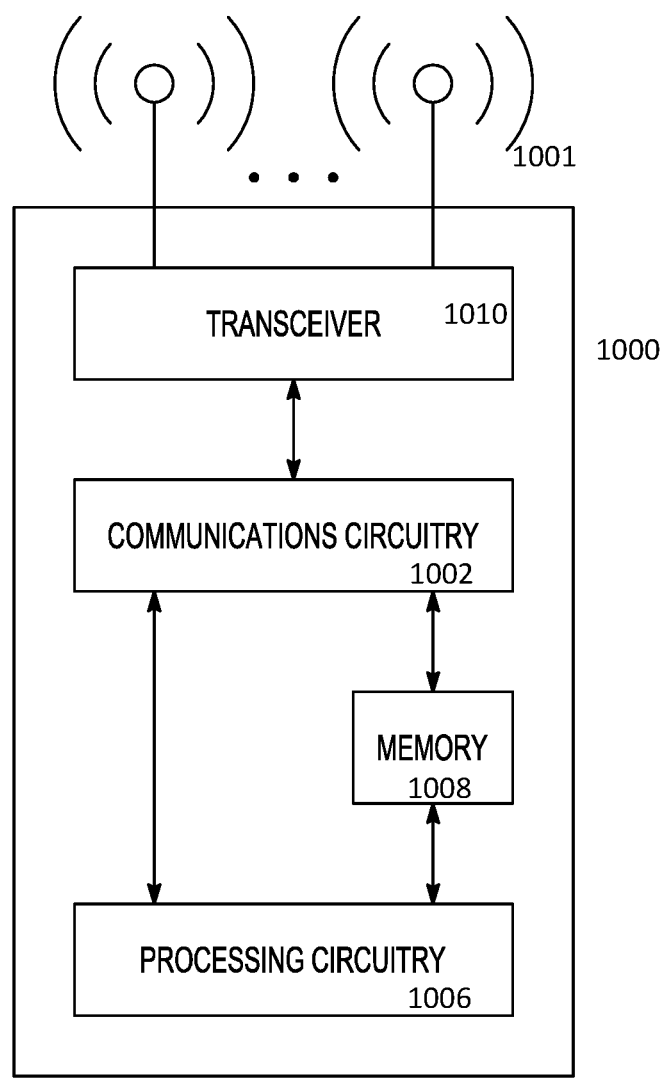
FIG. 10 illustrates a functional block diagram of a wireless communication device, in accordance with some embodiments.

FIG. 10 illustrates a functional block diagram of a wireless communication device, in accordance with some embodiments. In one embodiment, FIG. 10 illustrates a functional block diagram of a communication device (STA) that may be suitable for use as an AP STA, a non-AP STA or other user device in accordance with some embodiments. The communication device 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 1000 may include communications circuitry 1002 and a transceiver 1010 for transmitting and receiving signals to and from other communication devices using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication device 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication device 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication device 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 1000 may include one or more of a keyboard, a display, a non-volatile memory port, multiple antennas, a graphics processor, an application processor, speakers, and other mobile device elements. The display may be an LCD screen including a touch screen.

Although the communication device 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1000 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 11:
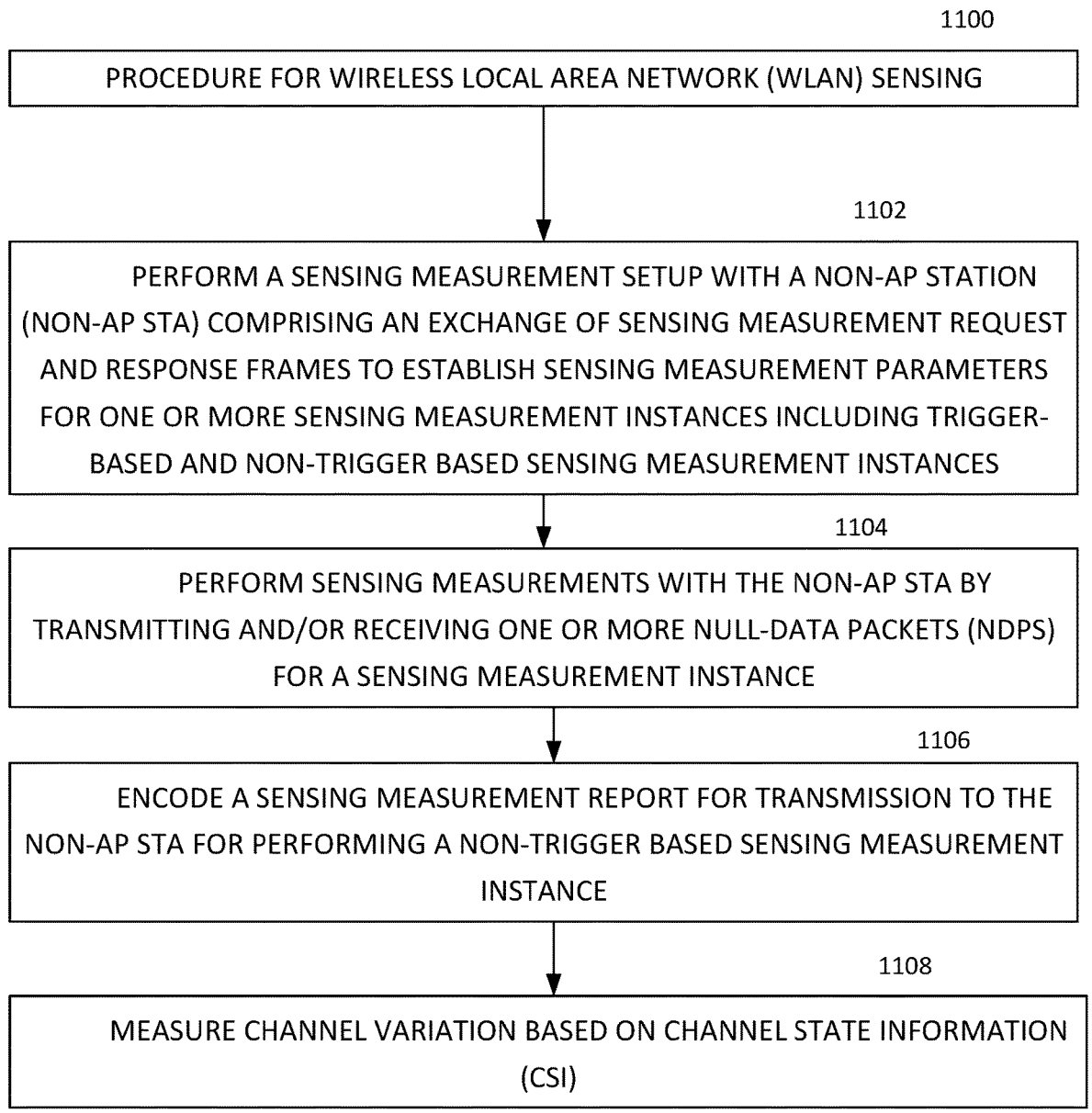
FIG. 11 is a procedure performed by processing circuitry of an access point station (AP) configured for wireless local area network (WLAN) sensing, in accordance with some embodiments.

FIG. 11 is a procedure performed by processing circuitry of an access point station (AP) configured for wireless local area network (WLAN) sensing, in accordance with some embodiments. Operation 1102 comprises performing a sensing measurement setup with a non-AP station (non-AP STA). The sensing measurement setup may comprise an exchange of sensing measurement request and response frames to establish sensing measurement parameters for one or more sensing measurement instances including trigger-based and non-trigger based sensing measurement instances.

Operation 1104 comprises performing sensing measurements with the non-AP STA by transmitting and/or receiving one or more null-data packets (NDPs) for a sensing measurement instance.

Operation 1106 comprises encoding a sensing measurement report for transmission to the non-AP STA for performing a non-trigger based sensing measurement instance when the AP is operating a sensing responder and when reporting was indicated in a sensing measurement setup request frame received from the non-AP STA.

Operation 1108 comprises measuring channel variation based on channel state information (C SI).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a non-access point station (non-AP STA) configured for wireless local area network (WLAN) sensing, the apparatus comprising: processing circuitry; and memory, wherein for the WLAN sensing, the processing circuitry is configured to:

exchange a sensing measurement request frame and a sensing measurement response frame with an AP station (AP) to establish operational parameters for one or more sensing measurement exchanges of a sensing measurement session;

the operational parameters to indicate whether the sensing measurement exchanges comprise trigger-based (TB) sensing measurement exchanges or non-TB sensing measurement exchanges, wherein for the non-TB sensing measurement exchanges, the operational parameters include a minimum time interval between two con secutive of the non-TB sensing measurement exchanges, perform one or more of the sensing measurement exchanges, each sensing measurement exchange comprising null-data packet (NDP) transmissions and NDP receptions, the NDP transmissions and NDP receptions comprising NDPs configured in accordance with the operation parameters established for the sensing measurement session; and wherein after a measurement sounding phase of one of the sensing measurement exchanges when a sensing measurement report field was set to 1 in a sensing measurement report requested field of the sensing measurement request frame, the processing circuitry is configured to:

encode a sensing measurement report frame for transmission to the AP when the non-AP STA is operating as a sensing responder; and decode a sensing measurement report frame received from the AP when the AP is operating as the sensing responder, and estimate features of objects in an area of interest based on sensing measurements reported during the one or more sensing measurement exchanges.

2. The apparatus of claim 1, wherein for the non-TB sensing measurement exchanges, the processing circuitry is to configure the non-AP STA to refrain from initiating one of the non-TB sensing measurement exchanges of the sensing measurement session until the minimum time interval between two consecutive of the non-TB sensing measurement exchanges has elapsed.

3. The apparatus of claim 2, wherein when the sensing measurement report field is set to 0 in the sensing measurement report requested field of the sensing measurement request frame, the processing circuitry is configured refrain from encoding the sensing measurement report frame for transmission to the AP when the non-AP STA is operating as the sensing responder.

4. The apparatus of claim 3, wherein the sensing measurement request and response frames include a sensing measurement parameters element to indicate the operational parameters for the one or more sensing measurement exchanges of the sensing measurement session.

5. The apparatus of claim 4, wherein after the measurement sounding phase of one of the sensing measurement exchanges of the sensing measurement session when the sensing measurement report requested field is set to 1, the processing circuitry is configured to encode the sensing measurement report frame for transmission to the AP immediately after measurement sounding phase during a reporting phase.

6. The apparatus of claim 5, wherein for immediate reporting when the AP is operating as the sensing responder, the sensing measurement report frame received from the AP includes sensing measurement results from a current non-TB sensing measurement exchange for all non-TB sensing measurement exchanges of the sensing measurement session.

7. The apparatus of claim 6, wherein for non-immediate reporting when the AP is operating as the sensing responder, the sensing measurement report frame received from the AP include sensing measurement results from a previous non-TB sensing measurement exchange for all non-TB sensing measurement exchanges of the sensing measurement session except for a first of the non-TB sensing measurement exchanges of the sensing measurement session, and wherein for the first of the non-TB sensing measurement exchanges of the sensing measurement session for non-immediate reporting, an Invalid Measurement field in the Sensing Measurement Report frame received from the AP is set to 1.

8. The apparatus of claim 7, wherein the sensing measurements comprise measurements of channel state information (CSI), and
wherein the processing circuitry is configured estimate the features of objects based variation of the CSI.

9. The apparatus of claim 2, wherein for the non-TB sensing measurement exchanges when the AP is operating the sensing responder, as part of the measurement sounding phase the processing circuitry is configured to:
encode a sensing NDP announcement (NDPA) frame for transmission to the AP;
encode a sensing initiator to sensing responder (SI2SR) NDP for transmission to the AP after the sensing NDPA frame; and
decode a sensing responder to sensing initiator (SR2SI) NDP received from the AP after receipt of the SI2SR NDP.

10. The apparatus of claim 2, wherein for the TB sensing measurement exchanges when the non-AP STA is operating the sensing responder, as part of the measurement sounding phase the processing circuitry is configured to:
decode a sensing NDP announcement (NDPA) frame received from the AP; and
decode a sensing initiator to sensing responder (SI2SR) NDP received from the AP after the sensing NDPA frame.

11. A non-transitory computer-readable storage medium that stores instructions for execution by processing circuitry of a non-access point station (non-AP STA) configured for wireless local area network (WLAN) sensing, wherein for the WLAN sensing, the processing circuitry is configured to:
exchange a sensing measurement request frame and a sensing measurement response frame with an AP station (AP) to establish operational parameters for one or more sensing measurement exchanges of a sensing measurement session;
the operational parameters to indicate whether the sensing measurement exchanges comprise trigger-based (TB) sensing measurement exchanges or non-TB sensing measurement exchanges,
wherein for the non-TB sensing measurement exchanges, the operational parameters include a minimum time interval between two consecutive of the non-TB sensing measurement exchanges,
perform one or more of the sensing measurement exchanges, each sensing measurement exchange comprising null-data packet (NDP) transmissions and NDP receptions, the NDP transmissions and NDP receptions comprising NDPs configured in accordance with the operation parameters established for the sensing measurement session; and
wherein after a measurement sounding phase of one of the sensing measurement exchanges when a sensing measurement report field was set to 1 in a sensing measurement report requested field of the sensing measurement request frame, the processing circuitry is configured to:
encode a sensing measurement report frame for transmission to the AP when the non-AP STA is operating as a sensing responder; and
decode a sensing measurement report frame received from the AP when the AP is operating as the sensing responder, and
estimate features of objects in an area of interest based on sensing measurements reported during the one or more sensing measurement exchanges.

12. The non-transitory computer-readable storage medium of claim 11, wherein for the non-TB sensing measurement exchanges, the processing circuitry is to configure the non-AP STA to refrain from initiating one of the non-TB sensing measurement exchanges of the sensing measurement session until the minimum time interval between two consecutive of the non-TB sensing measurement exchanges has elapsed.

13. The non-transitory computer-readable storage medium of claim 12, wherein when the sensing measurement report field is set to 0 in the sensing measurement report requested field of the sensing measurement request frame, the processing circuitry is configured refrain from encoding the sensing measurement report frame for transmission to the AP when the non-AP STA is operating as the sensing responder.

14. The non-transitory computer-readable storage medium of claim 13, wherein the sensing measurement request and response frames include a sensing measurement parameters element to indicate the operational parameters for the one or more sensing measurement exchanges of the sensing measurement session.

15. The non-transitory computer-readable storage medium of claim 14, wherein after the measurement sounding phase of one of the sensing measurement exchanges of the sensing measurement session when the sensing measurement report requested field is set to 1, the processing circuitry is configured to encode the sensing measurement report frame for transmission to the AP immediately after measurement sounding phase during a reporting phase.

16. The non-transitory computer-readable storage medium of claim 15, wherein for immediate reporting when the AP is operating as the sensing responder, the sensing measurement report frame received from the AP includes sensing measurement results from a current non-TB sensing measurement exchange for all non-TB sensing measurement exchanges of the sensing measurement session.

17. The non-transitory computer-readable storage medium of claim 16, wherein for non-immediate reporting when the AP is operating as the sensing responder, the sensing measurement report frame received from the AP include sensing measurement results from a previous non-TB sensing measurement exchange for all non-TB sensing measurement exchanges of the sensing measurement session except for a first of the non-TB sensing measurement exchanges of the sensing measurement session, and
wherein for the first of the non-TB sensing measurement exchanges of the sensing measurement session for non-immediate reporting, an Invalid Measurement field in the Sensing Measurement Report frame received from the AP is set to 1.

18. A method performed by processing circuitry of a non-access point station (non-AP STA) configured for wireless local area network (WLAN) sensing, the method comprising:
exchanging a sensing measurement request frame and a sensing measurement response frame with an AP station (AP) to establish operational parameters for one or more sensing measurement exchanges of a sensing measurement session, the operational parameters to indicate whether the sensing measurement exchanges comprise trigger-based (TB) sensing measurement exchanges or non-TB sensing measurement exchanges, wherein for the non-TB sensing measurement exchanges, the operational parameters include a minimum time interval between two consecutive of the non-TB sensing measurement exchanges, performing one or more of the sensing measurement exchanges, each sensing measurement exchange comprising null-data packet (NDP) transmissions and NDP receptions, the NDP transmissions and NDP receptions comprising NDPs configured in accordance with the operation parameters established for the sensing measurement session; and wherein after a measurement sounding phase of one of the sensing measurement exchanges when a sensing measurement report field was set to 1 in a sensing measurement report requested field of the sensing measurement request frame, the method further comprises:

encoding a sensing measurement report frame for transmission to the AP when the non-AP STA is operating as a sensing responder; and decoding a sensing measurement report frame received from the AP when the AP is operating as the sensing responder, and estimating features of objects in an area of interest based on sensing measurements reported during the one or more sensing measurement exchanges.

19. The method of claim 18, wherein for the non-TB sensing measurement exchanges, the method comprises refraining, by the non-AP STA, from initiating one of the non-TB sensing measurement exchanges of the sensing measurement session until the minimum time interval between two consecutive of the non-TB sensing measurement exchanges has elapsed.

20. The method of claim 19, wherein when the sensing measurement report field is set to 0 in the sensing measurement report requested field of the sensing measurement request frame, the method comprises refraining from encoding the sensing measurement report frame for transmission to the AP when the non-AP STA is operating as the sensing responder.

* * * * *